US012142882B2

(12) United States Patent
Kisling

(10) Patent No.: US 12,142,882 B2
(45) **Date of Patent: *Nov. 12, 2024**

(54) LOCKING RF COAXIAL CONNECTOR

(71) Applicant: Corning Optical Communications RF LLC, Glendale, AZ (US)

(72) Inventor: Brian Lyle Kisling, Youngtown, AZ (US)

(73) Assignee: CORNING OPTICAL COMMUNICATIONS RF LLC, Glendale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/210,795

(22) Filed: Jun. 16, 2023

(65) Prior Publication Data

US 2023/0327382 A1 Oct. 12, 2023

Related U.S. Application Data

(60) Division of application No. 17/327,546, filed on May 21, 2021, now Pat. No. 11,728,598, which is a (Continued)

(51) Int. Cl.
*H01R 24/40* (2011.01)
*H01R 9/05* (2006.01)
(Continued)

(52) U.S. Cl.
CPC ............... *H01R 24/40* (2013.01); *H01R 9/05* (2013.01); *H01R 13/20* (2013.01); *H01R 13/639* (2013.01); *H01R 2103/00* (2013.01)

(58) Field of Classification Search
CPC . H01R 24/40; H01R 13/6277; H01R 13/6271
See application file for complete search history.

(56) References Cited

U.S. PATENT DOCUMENTS 2,877,437 A 3/1959 Flanagan, Jr.
3,525,973 A 8/1970 Kipnes
(Continued)

FOREIGN PATENT DOCUMENTS

CA 2387867 A1 4/2001
FR 3034574 A3 10/2016
(Continued)

OTHER PUBLICATIONS

European Patent Application No. 19891057.2, European Search Report, dated Jul. 1, 2022; 10 pages; European Patent Office.
(Continued)

*Primary Examiner* — Neil Abrams
(74) *Attorney, Agent, or Firm* — Tamika A. Crawl-Bey

(57) ABSTRACT

RF coaxial connectors, configured for multiple locking engagements, include a male connector and a female connector. The male connector has a male connector central conductor, a male connector dielectric positionable over a section of the male connector central conductor, a male connector bushing positionable over the male connector dielectric and over a portion of the male connector central conductor, a male connector outer conductor positionable over the male connector dielectric and at least a portion of the male connector bushing, the male connector outer conductor. The female connector has a female connector central conductor, a female connector dielectric positionable over at least a portion of the female connector central conductor, a female connector outer conductor positionable over at least a portion of the female connector central conductor and the female connector dielectric, and a female connector locking element positionable over the female connector outer conductor.

20 Claims, 8 Drawing Sheets

Related U.S. Application Data continuation of application No. PCT/US2019/061920, filed on Nov. 18, 2019.

(60) Provisional application No. 62/772,141, filed on Nov. 28, 2018.

(51) Int. Cl.

| | |
|---|---|
| ***H01R 13/20*** | (2006.01) |
| ***H01R 13/639*** | (2006.01) |
| *H01R 103/00* | (2006.01) |

(56) References Cited

U.S. PATENT DOCUMENTS

| | | | | |
|---|---|---|---|---|
| 3,671,922 A | 6/1972 | Zerlin et al. | | |
| 3,680,033 A | 7/1972 | Kawai | | |
| 3,953,098 A * | 4/1976 | Avery | H01R 13/635 | 439/258 |
| 4,017,139 A * | 4/1977 | Nelson | F16L 37/133 | 439/675 |
| 4,026,581 A | 5/1977 | Pasbrig | | |
| 4,036,515 A | 7/1977 | Karcher et al. | | |
| 4,619,496 A * | 10/1986 | Forney, Jr. | H01R 24/40 | 439/948 |
| 5,074,809 A | 12/1991 | Rousseau | | |
| 5,102,351 A | 4/1992 | Meshel | | |
| 5,147,221 A | 9/1992 | Cull et al. | | |
| 5,176,533 A * | 1/1993 | Sakurai | H01R 13/6277 | 439/352 |
| 5,611,707 A | 3/1997 | Meynier | | |
| 5,938,465 A * | 8/1999 | Fox, Sr. | H01R 13/627 | 439/578 |
| 6,439,925 B1 * | 8/2002 | Lin | H01R 13/6277 | 439/350 |
| 6,645,011 B2 | 11/2003 | Schneider et al. | | |
| 6,663,397 B1 | 12/2003 | Lin et al. | | |
| 6,692,286 B1 | 2/2004 | De Cet | | |
| 7,322,846 B2 * | 1/2008 | Camelio | H01R 13/6277 | 439/352 |
| 7,481,673 B1 | 1/2009 | Qu et al. | | |
| 7,500,873 B1 * | 3/2009 | Hart | H01R 13/025 | 439/63 |
| 7,758,370 B1 | 7/2010 | Flaherty | | |
| 7,892,004 B2 * | 2/2011 | Hertzler | H01R 13/6277 | 439/312 |
| 8,087,954 B2 * | 1/2012 | Fuchs | H01R 13/6275 | 439/352 |
| 8,496,495 B2 | 7/2013 | Kari | | |
| 8,597,050 B2 | 12/2013 | Flaherty et al. | | |
| 8,628,362 B2 | 1/2014 | Maki | | |
| 8,915,753 B2 | 12/2014 | Holland et al. | | |
| 9,022,799 B2 | 5/2015 | Sorolla Rosario et al. | | |
| 9,130,289 B2 * | 9/2015 | Leiba | H01R 13/20 | |
| 9,236,694 B2 | 1/2016 | Binder et al. | | |
| 11,728,598 B2 * | 8/2023 | Kisling | H01R 13/20 | 439/578 |
| 2004/0014350 A1 * | 1/2004 | McMullen | H01R 24/40 | 439/350 |
| 2004/0185707 A1 | 9/2004 | Holliday | | |
| 2005/0277331 A1 | 12/2005 | Hall | | |
| 2007/0275584 A1 | 11/2007 | Keating | | |
| 2010/0304579 A1 | 12/2010 | Kisling | | |
| 2013/0052855 A1 | 2/2013 | Komatsubara | | |
| 2014/0148044 A1 | 5/2014 | Balcer et al. | | |
| 2016/0322751 A1 | 11/2016 | Van Swearingen et al. | | |
| 2016/0336696 A1 | 11/2016 | Holland | | |
| 2017/0012393 A1 | 1/2017 | Mahmood | | |
| 2021/0281024 A1 | 9/2021 | Kisling | | |

FOREIGN PATENT DOCUMENTS

| | | |
|---|---|---|
| KR | 10-1097281 B1 | 12/2011 |
| TW | M490685 U | 11/2014 |

OTHER PUBLICATIONS

International Search Report and Written Opinion of the International Searching Authority; PCT/US19/61920; dated Mar. 17, 2020; 10 pages; European Patent Office.

Taiwanese Patent Application No. 108143112, Office Action dated Jun. 26, 2023, 2 pages (English Translation Only); Taiwanese Patent Office.

* cited by examiner

LOCKING RF COAXIAL CONNECTOR

CROSS-REFERENCE TO RELATED APPLICATIONS

This application is a divisional of U.S. application Ser. No. 17/327,546, filed on May 21, 2021, which is a continuation of International Application No. PCT/US2019/061920, filed Nov. 18, 2019, which claims the benefit of priority to U.S. Provisional Application Ser. No. 62/772,141, filed Nov. 28, 2018. The content of each aforementioned application is relied upon and incorporated herein by reference in its entirety.

BACKGROUND

The present disclosure generally relates to radio frequency (RF) electrical connectors, and, more particularly, to blind mate high frequency RF electrical connectors utilized in high stress, high vibration environments configured for multiple locking engagements.

RF electrical connectors are used to attach cables and other devices which carry and process RF signals. Among the many different types of RF electrical connectors are a type known in the industry as "blind mate" connectors. Commercial examples include GPO and GPPO connectors produced by Corning Optical Communications.

Such examples employ the use of a male shroud, including a pin contact, a female interface, a slotted outer conductor, and a socket contact. These blind mate connectors also include a center metallic conductor, an outer tubular metallic conductor, and an electrically-insulative dielectric interposed between the center conductor and the outer conductor. The ends of the center metallic conductor are typically formed into resilient, spring-like slotted fingers for gripping a center conductor of a mating male shroud.

Variations of the female devices include cable connectors that attach a coaxial cable to a male shroud. This type of blind mate cable connector system relies on a snap-fit between the male and female connectors. The snap-fit is created by an interlocking action of spring fingers of the female connector and a corresponding undercut, known as a detent, in the male connector.

Continuous and reliable signal transmission depends on uninterrupted contact along both the inner conductor path and the outer conductor path of the connector system. In most applications, contact is reliably achieved utilizing blind mate interconnect systems. However, in some instances, particularly instances having extreme stress and vibrations, blind mate connectors de-mate from each other.

Accordingly, there is a need to improve upon existing blind mate RF connectors. There is also a need to improve upon a blind mate connector's ability to resist forces that cause unintentional de-mating and maintain signal integrity under adverse operational conditions. In addition, there is a need to ensure that mated connector pairs fit as intended in corresponding junctions. This mated fit between connector pairs is known as "keying."

Various embodiments of the RF coaxial connectors disclosed herein seek to address the aforementioned needs, as well as provide further related advantages.

SUMMARY

In accordance with one aspect, the present disclosure is directed toward RF coaxial connectors that includes a male connector and a female connector that mate at a plurality of stages such that the male connector and the female connector are configured for multiple locking engagements.

According to one aspect of the disclosure, a male connector includes a male connector central conductor, a male connector dielectric positionable over an outer surface of the male connector central conductor, a male connector bushing positionable adjacent to the male connector dielectric and over at least a portion of the male connector central conductor, and a male connector outer conductor positionable over an outer surface of the male connector dielectric and at least a portion of the male connector bushing, conductor. The male connector outer conductor has a plurality of stepped inner surfaces having a detent and a radially outward extending locking feature.

The RF coaxial connector also includes a first exemplary embodiment of a female connector that includes a female connector central conductor, a female connector dielectric positionable over the female connector central conductor, and a female connector outer conductor positionable over at least a portion of the female connector central conductor and the female connector dielectric. The female connector outer conductor includes a plurality of fingers. The female connector also includes a bushing positionable in an end opening of the female connector outer conductor, and a female connector locking element positionable over the female connector outer conductor. The female connector locking element has an inwardly extending annular element and a plurality of slotted fingers, with at least one finger having a radially inward extending locking feature.

Figure 1:
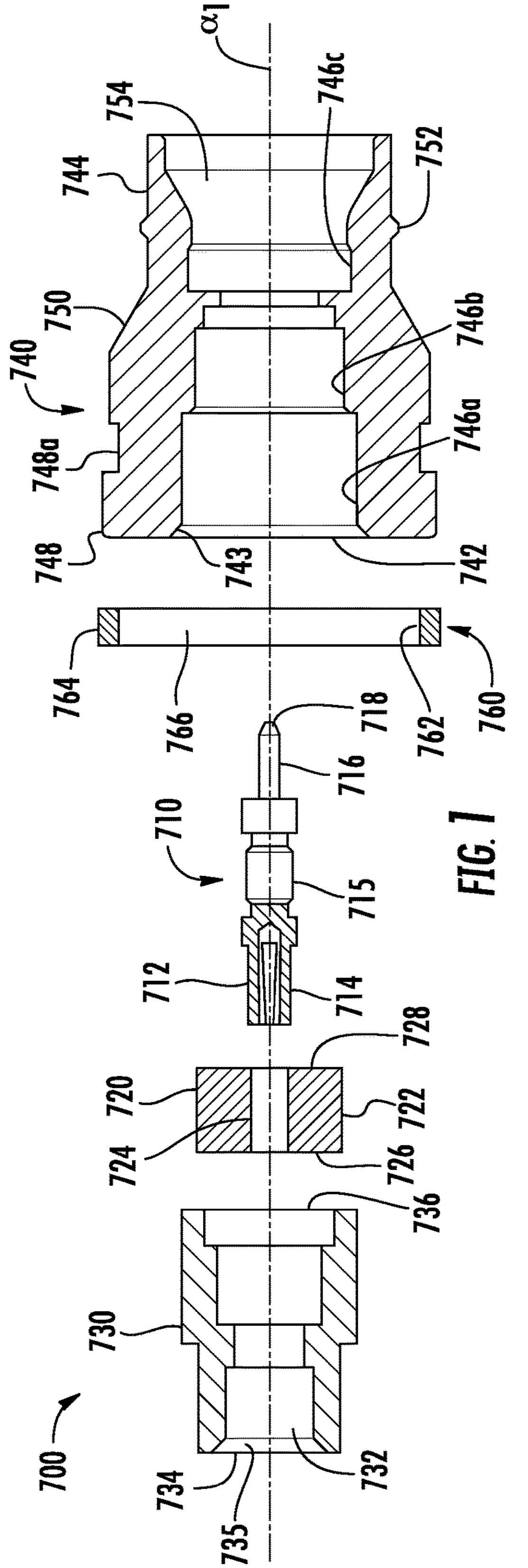
FIG. 1 is an exploded cross-sectional view of an exemplary embodiment of a male connector.

It is to be understood that both the foregoing general description and the following detailed description are merely exemplary and intended to provide an overview or framework to understanding the nature and character of the claims. The accompanying drawings are included to provide a further understanding, and are incorporated in and constitute a part of this specification. The drawings illustrate one or more embodiments, and together with the description explain the principles and operation of the various embodiments.

DETAILED DESCRIPTION

In the following detailed description, reference is made to the accompanying drawings, which form a part hereof. In the drawings, similar symbols may be used to identify similar components, unless context dictates otherwise.

Moreover, the illustrative embodiments described in the detailed description, drawings, and claims are not meant to be limiting. Other embodiments may be utilized, and other changes may be made, without departing from the spirit or scope of the subject matter presented herein.

Also, it will be readily understood that the aspects of the present disclosure, as generally described herein, and illustrated in the various accompanying figures, can be arranged, substituted, combined, separated, and designed in a wide variety of different configurations, all of which are explicitly contemplated herein. It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present.

It will be further understood that, although the terms "first", "second", etc. may be used herein to describe various elements, components, etc., these elements, components, etc. should not be limited by these terms. These terms are only used to distinguish one element, component, etc. from another element, component, etc. Thus, a "first" element or component discussed below could also be termed a "second" element or component without departing from the teachings of the present invention. In addition, the sequence of operations (or steps) is not limited to the order presented in the claims unless specifically indicated otherwise.

Disclosed herein are RF electrical connector pairs P1 (FIGS. 5A-5D) and P2 (FIGS. 8A-8E) that include a male connector 700 and female connectors 800, 800' in respective embodiments. Such connectors are "blind mate" connectors, which are used to attach cables and other devices which carry and process RF signals. Blind mate connectors are configured to align connector pair and achieve sufficiently reliable interconnection between the respective ports on such connector pairs. The connectors typically measure less than 10.2 mm (0.40 inch) in length, and only approximately 3.3 mm (0.13 inch) in diameter, allowing for high packing densities. Each blind mate connector generally includes at least a center conductor, an outer conductor, and an electrically-insulative dielectric interposed between the center conductor and the outer conductor. In some embodiments, the ends of the center conductor are formed into resilient, spring-like slotted fingers for gripping a received center conductor of a mating cable.

Exemplary blind mate connectors are described in U.S. Pat. Nos. 7,128,604 (604 Patent), 7,478,475 (475 Patent), and International Application Number PCT/US18/61964 (964 International Application), the disclosures of which are incorporated herein by reference in their entirety. Various features of the connectors described in the '604 Patent, the '475 Patent, and the '964 International Application may be included in the embodiments described herein.

Figure 2:
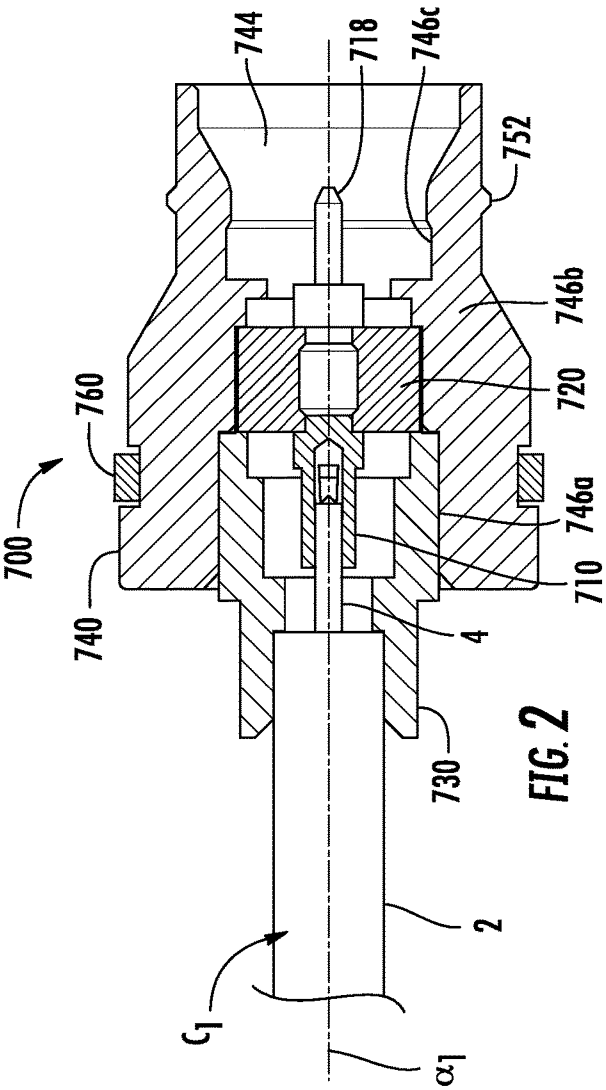
FIG. 2 is an assembled cross-sectional view of the male connector shown in FIG. 1 coupled to an end of a coaxial cable.

FIG. 1 is an exploded cross-sectional view of an exemplary embodiment of a male connector 700, while FIG. 2 is an assembled cross-sectional view of the male connector 700. This embodiment of the male connector 700 includes a male connector central conductor 710, a male connector dielectric 720, a male connector bushing 730, a male connector outer conductor 740, and a male connector identifier ring 760. Each of these elements, upon assembly, are substantially aligned along a central axis $\alpha_1$.

The male connector central conductor 710 has a first end 712 formed as a female socket, including at least two slotted fingers 714. The fingers 714 open outwardly to receive a mating coaxial cable $C_1$ (FIG. 2). The male connector central conductor 710 has a second end 716 opposing the first end 712, which includes a central conductor pin element 718. A medial central conductor portion 715 connects the first end 712 and the second end 716. The central conductor 710 is positionable within the male connector dielectric 720, as particularly shown in FIG. 2.

The male connector dielectric 720 includes an outer diametral surface 722 and an inner bore 724, extending between a first dielectric end 726 and a second dielectric end 728.

The male connector 700 also includes a male connector bushing 730 having stepped inner surfaces 732, a first bushing end 734, having a chamfer 735, a second bushing end 736, and stepped outer surfaces 738. As shown in FIG. 2, the first bushing end 734 is configured to receive a coaxial cable $C_1$ (not shown in cross-section). The cable $C_1$ has a sheath 2 and a prepared end 4, which as shown in FIG. 2 as being inserted into the first end 712 of the male connector central conductor 710.

Positionable over the male conductor dielectric 720 and the male connector bushing 730 is the male connector outer conductor 740. The male connector outer conductor 740 includes a first outer conductor end 742, having a chamfer 743, a second outer conductor end 744, a plurality of stepped inner surfaces 746, a plurality of stepped outer surfaces 748, an angled outer surface 750, a radially outward extending locking feature 752, and an opening 754. The plurality of stepped inner surfaces 746 includes at least two stepped surfaces 746*a*, 746*b*.

Referring to FIG. 2, stepped surface 746*b* surrounds the outer diametral surface 722 of the male connector dielectric 720, while stepped surface 746*a* surrounds a portion of the male connector bushing 730. An inner stepped surface is further configured as a detent 746*c*, which is configured to mate with corresponding surfaces of female connectors 800, 800', as further described with reference to FIGS. 5A-5D.

The plurality of stepped outer surfaces 748 includes a ring detent 748*a* configured to mate with an identifier ring 760. The identifier ring 760 is optional and used to identify mating pairs of male and female connectors. The identifier ring 760 includes an inner diametral surface 762, an outer diametral surface 764, and a through bore 766. The locking feature 752 extends outwardly such that upon assembly of the male connector, the locking feature 752 facilitates mating of the male connector 700 with female connectors 800, 800'.

Figure 3:
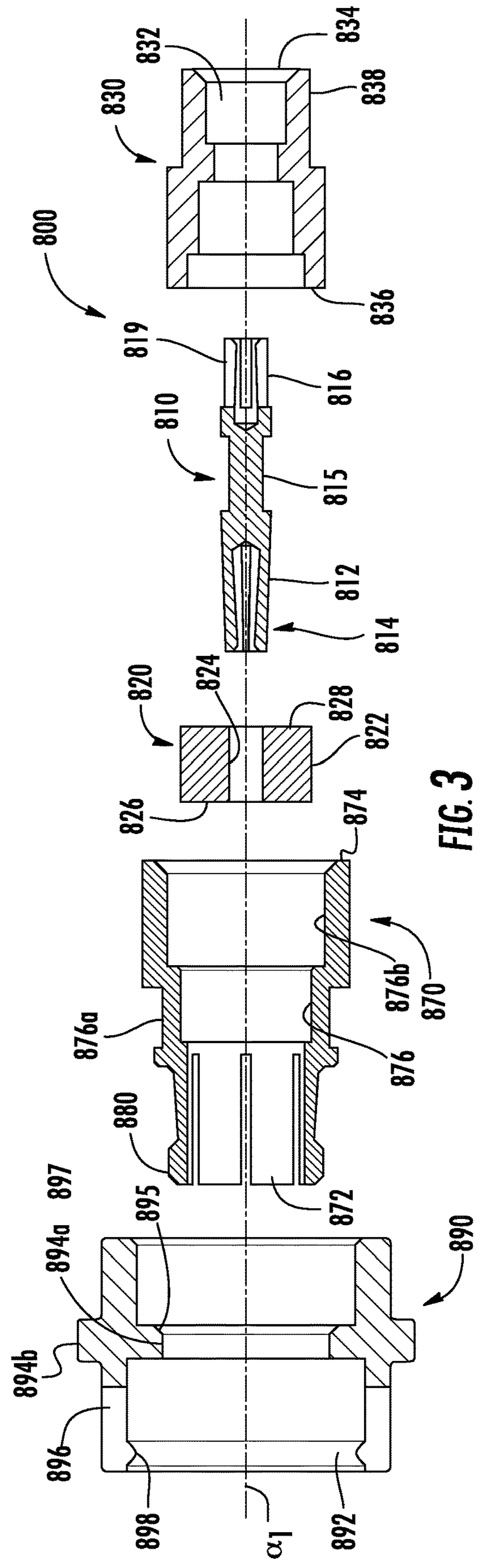
FIG. 3 is an exploded cross-sectional view of an exemplary embodiment of a female connector.
Figure 4:
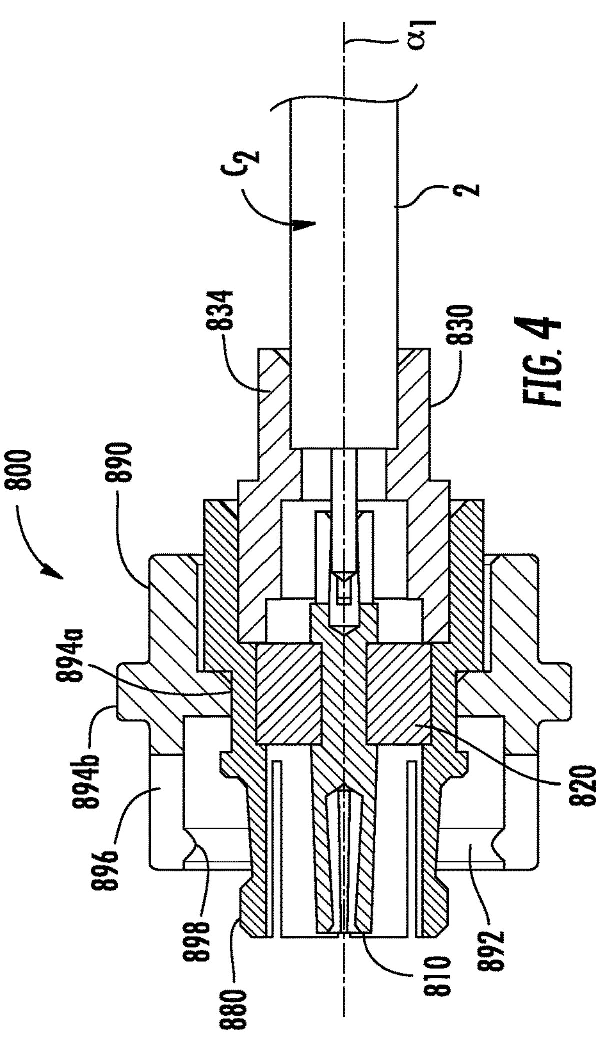
FIG. 4 is an assembled cross-sectional view of the female connector shown in FIG. 3 coupled to an end of a coaxial cable.

Referring to FIGS. 3-4, the female connector 800 is shown at least partially including a female connector central conductor 810, a female connector dielectric 820, a female connector bushing 830, a female connector outer conductor 870, and a female connector locking element 890. The female connector central conductor 810 has a first end 812 and a second end 816 both formed as a female socket. A medial central conductor portion 815 connects the first end 812 and the second end 816. Each female socket includes at least two slotted fingers 814, 819. Fingers 819 open radially outward and are configured to receive a mating coaxial member of coaxial cable end $C_2$ (FIG. 3). Fingers 814 also open outwardly and are configured to receive the pin element 718 of the mating male connector central conductor 710 (FIG. 3). The central conductor 810 is positionable within the female connector dielectric 820 and the female connector bushing 830, as particularly shown in FIG. 4.

The female connector dielectric 820 includes an outer diametral surface 822 and an inner bore 824 extending between a first dielectric end 826 and a second dielectric end 828.

The female connector 800 also includes a female connector bushing 830 having a plurality of stepped inner surfaces 832, a first bushing end 834, a second bushing end 836, and a plurality of stepped outer surfaces 838. As shown in FIG. 4, the first bushing end 834 is configured to receive a coaxial cable end $C_1$ (not shown in cross-section).

Referring to FIG. 4, the female connector outer conductor 870 is positionable over the female conductor dielectric 820 and a portion of the female connector bushing 830. The outer conductor 870 includes a first outer conductor end 872, a second outer conductor end 874, a plurality of stepped inner surfaces 876, a plurality of stepped outer surfaces 878, and fingers 880. The plurality of stepped inner surfaces 876 additionally includes two stepped surfaces 876*a*, 876*b*. A first stepped surface 876*a* surrounds the outer diametral surface 822 of the female connector dielectric 820, while a second stepped surface 876*b* surrounds a portion of the female connector bushing 830, as particularly shown in FIG. 4.

The female connector locking element 890 includes a through bore 892, an inner annular element 894*a*, an outer annular element 894*b*, slotted fingers 896, and a radially inward extending locking feature 898. The female connector locking element also includes chamfers 895, 897 that facilitate assembly.

Figure 5A:
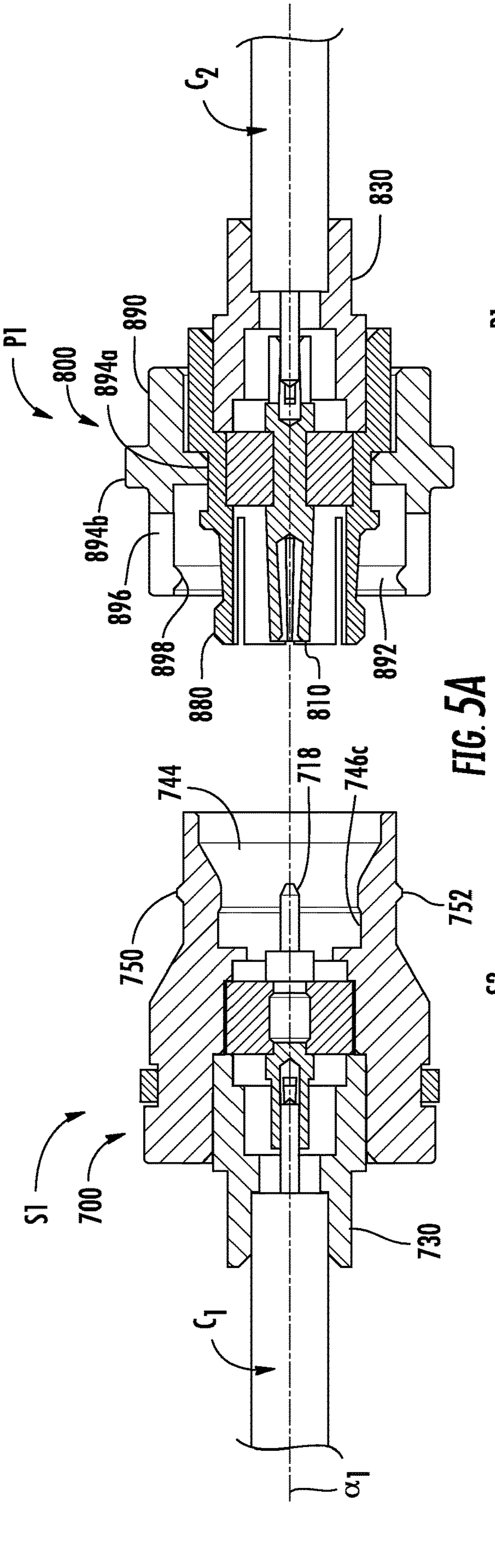
FIGS. 5A-5D is a cross-sectional view of a coaxial connector pair in various stages of assembly, including the male connector shown in FIGS. 1-2 and the female connector shown in FIGS. 3-4.
Figure 5B:
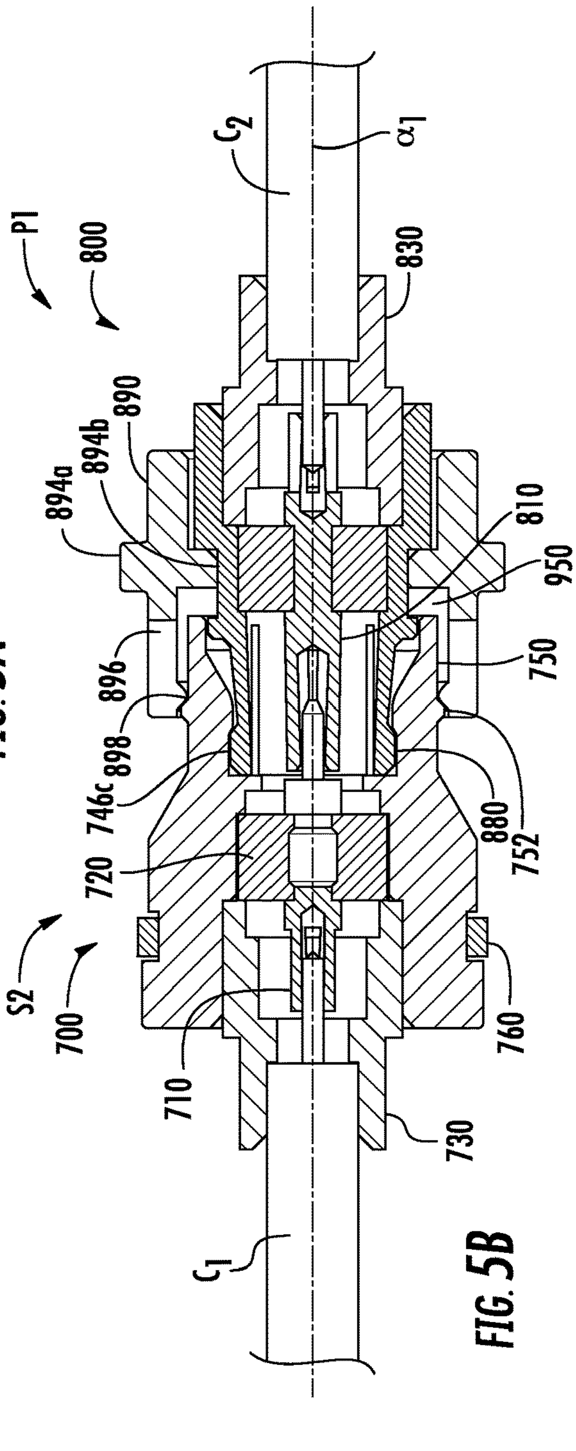
Figure 5C:
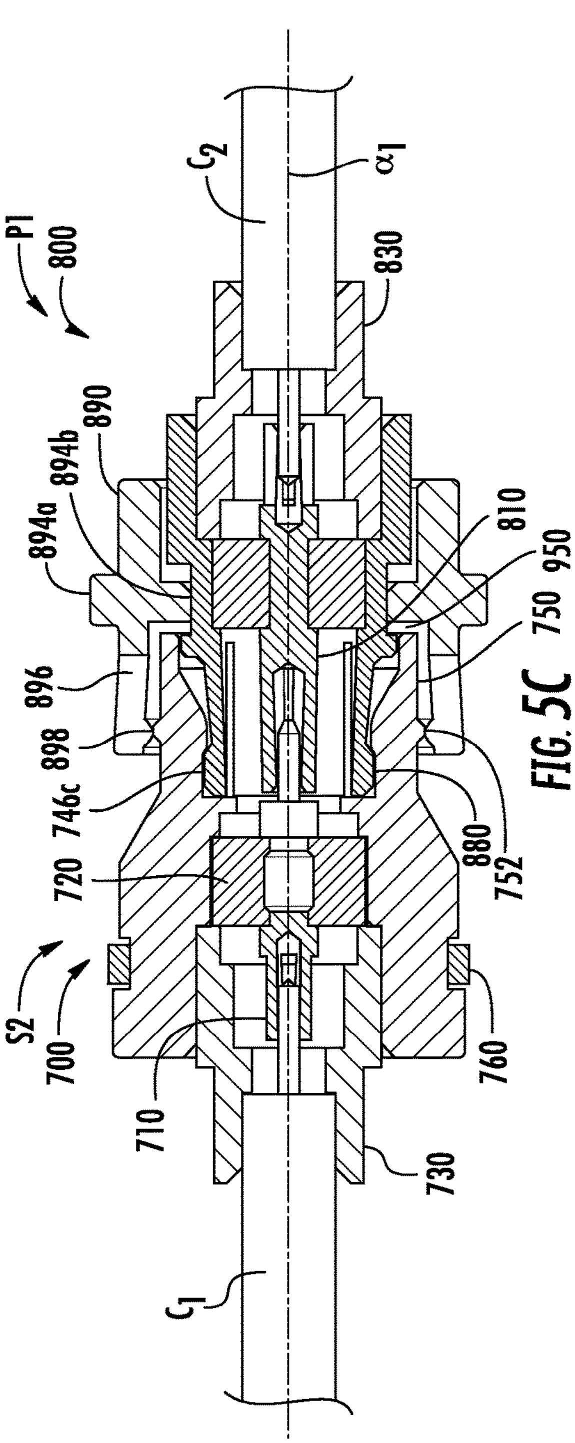
Figure 5D:
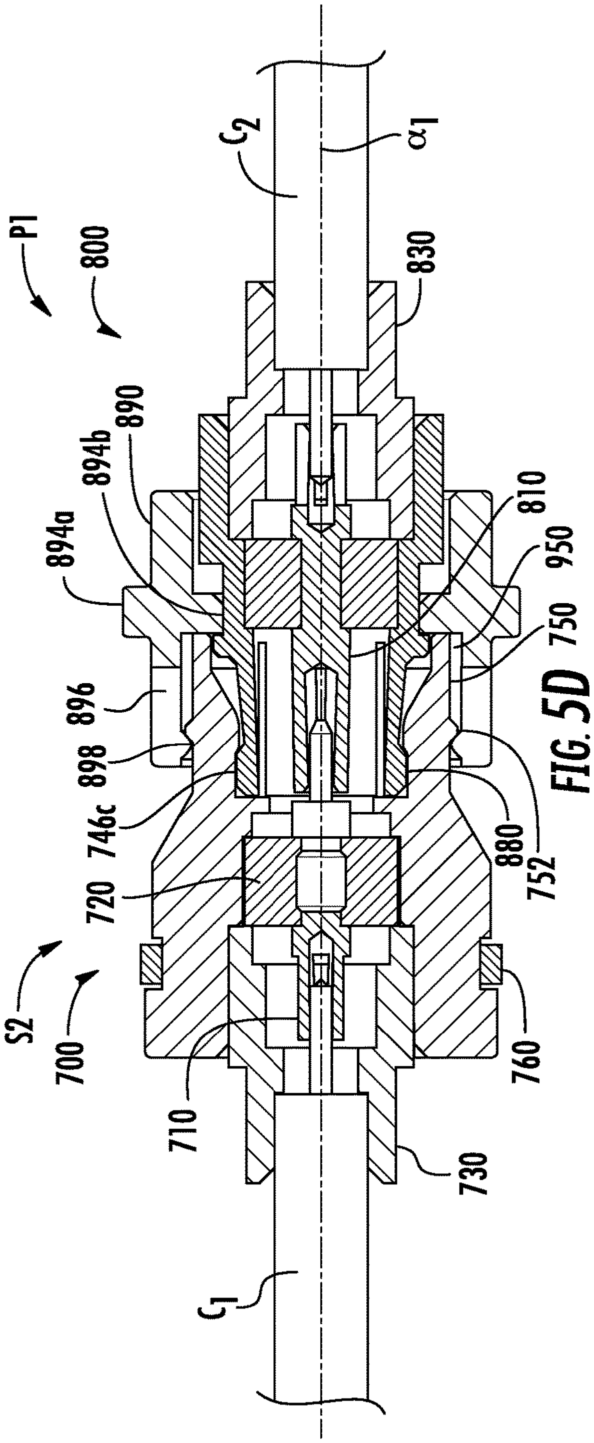

FIGS. 5A-5D are partial cross-sectional views of a coaxial cable connector pair P1, including the male connector 700 and the female connector 800, at various stages. Specifically, FIG. 5A shows the pair P1 at an unmated stage 51, FIG. 5B shows the pair P1 at an initially-mated stage S2, FIG. 5C shows the pair P1 at a partially-mated stage S3, and FIG. 5D shows the pair P1 at a fully-mated stage S4. At the respective stages, an interface opening 950 may be apparent.

At the S2 stage, the female connector 800 is advanced such that fingers 896 of the female connector locking element 890 are mated by snap-fit engagement of at least one finger into detent 746*c*. The locking element 890 remains in a disengaged rearward position, while the radial inward extending locking feature 898 of the locking element 890 is proximate to the locking feature 752 of the male connector 700.

At the S3 stage, the locking ring 805 has axially advanced toward the male connector 700. Referring to FIG. 5B, slotted fingers 896 are shown as being driven radially outwardly and positioned over the locking feature 752. At the fully-mated stage S4, shown in FIG. 5D, the locking element 890 has been axially advanced a greater distance toward the male connector 700. Here, slotted fingers 896 have returned to a radially inward position and has thereby engaged with the locking feature 898 behind the corresponding locking feature 752. In this manner, the connector pair P1 includes multiple locking engagements: a snap-fit engagement between fingers 880 and detent 746*c* and a locking engagement between locking features 752 and 898.

Figure 6:
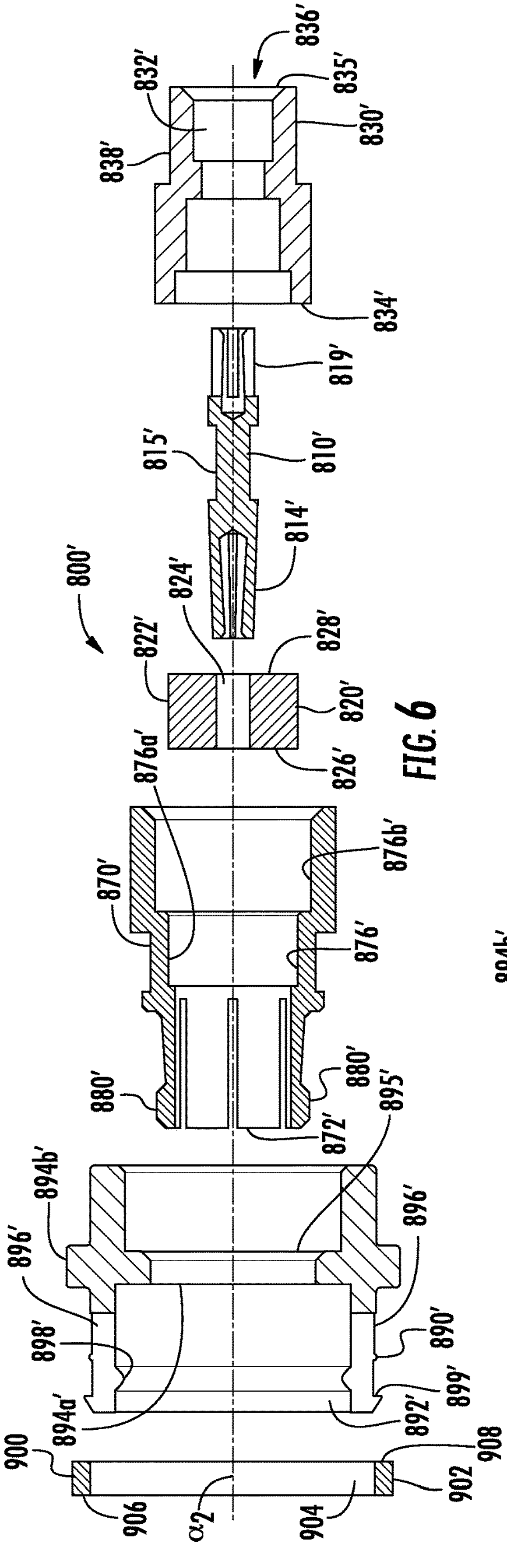
FIG. 6 is an exploded cross-sectional view of an exemplary embodiment of a female connector.
Figure 7:
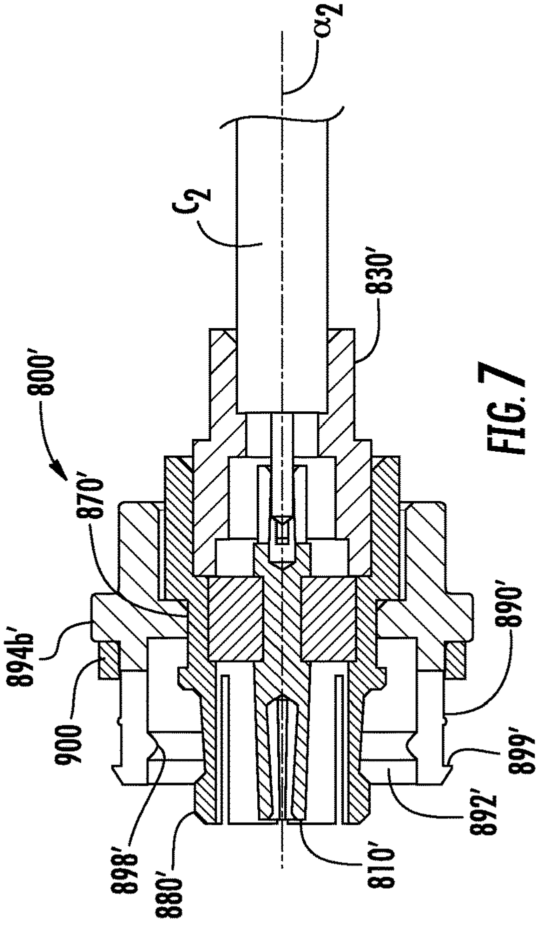
FIG. 7 is an assembled cross-sectional view of the female connector shown in FIG. 6 coupled to an end of a coaxial cable.

FIGS. 6 and 7 illustrate a second embodiment of a female connector 800'. The female connector 800' is shown at least partially including a female connector bushing 830', a female connector central conductor 810', a female connector dielectric 820', a female connector outer conductor 870' and a female connector locking element 890' with locking features 898', 899'. This embodiment of the female connector 800' also includes a locking ring 900 positionable over an outer surface of the female connector locking element 890'. The locking ring 900 has an outer diametral surface 902, and inner diametral surface 904, a first ring end 906, and a second ring end 908.

The female connector central conductor 810' includes a first end 812' and a second end 816' formed as female sockets with a medial central conductor portion 815' connecting the first end 812 and the second end 816. Each end 812', 816' has at least two slotted fingers 814', 819'. Fingers 819' are configured to open radially outward and mate with a coaxial cable end $C_2$ (FIG. 7).

The female connector dielectric 820' has an outer diametral surface 822' and an inner bore 824', which extends between a first dielectric end 826' and a second dielectric end 828'.

The female connector 800' also includes a female connector bushing 830' having a plurality of stepped inner surfaces 832', a first bushing end 834', a second bushing end 836' with a chamfer 835', and a plurality of stepped outer surfaces 838'. As shown in FIG. 7, the second bushing end 836' is configured to receive a coaxial cable end $C_2$ (not shown in cross-section).

The locking element 890' of the female connector 800' has a through bore 892', an inner annular element 894*a*' with a chamfer 895' and an outer annular element 894*b*'. Locking feature 898' is configured as an annular projection with two slanted surfaces that converge at an apex and locking feature 899' is configured as an annular ridge having a slanted surface and a substantially vertical surface on an opposite side.

Referring to FIG. 6, the female connector outer conductor 870' is positionable over the female connector dielectric 820' and a portion of the female connector bushing 830'. The outer conductor 870' includes a first outer conductor end 872', a second outer conductor end 874', a plurality of stepped inner surfaces 876', a plurality of stepped outer surfaces 878', and slotted fingers 880'. The plurality of stepped inner surfaces 876 additionally includes two stepped surfaces 876*a*', 876*b*'. Stepped surface 876*a*' surrounds the outer diametral surface 822' of the female connector dielectric 820', while stepped surface 876*b*' surrounds a portion of the female connector bushing 830', as particularly shown in FIG. 7.

The female connector locking element 890' includes a through bore 892', an inner annular element 894*a*', an outer annular element 894*b*, at least two slotted fingers 896', and a radially inward extending locking feature 898'. The female connector locking element also includes chamfers 895, 897 that facilitate assembly.

Figure 8A:
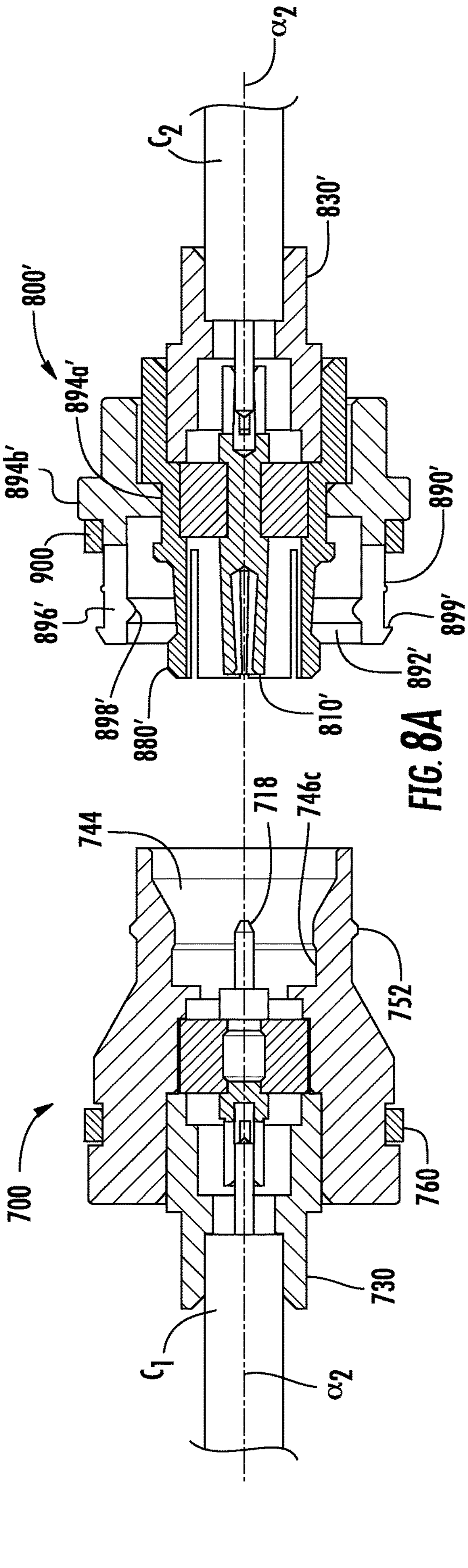
FIGS. 8A-8E is a cross-sectional view of a coaxial connector pair in various stages of assembly, including the male connector shown in FIGS. 1-2 and the female connector shown in FIGS. 6-7.
Figure 8B:
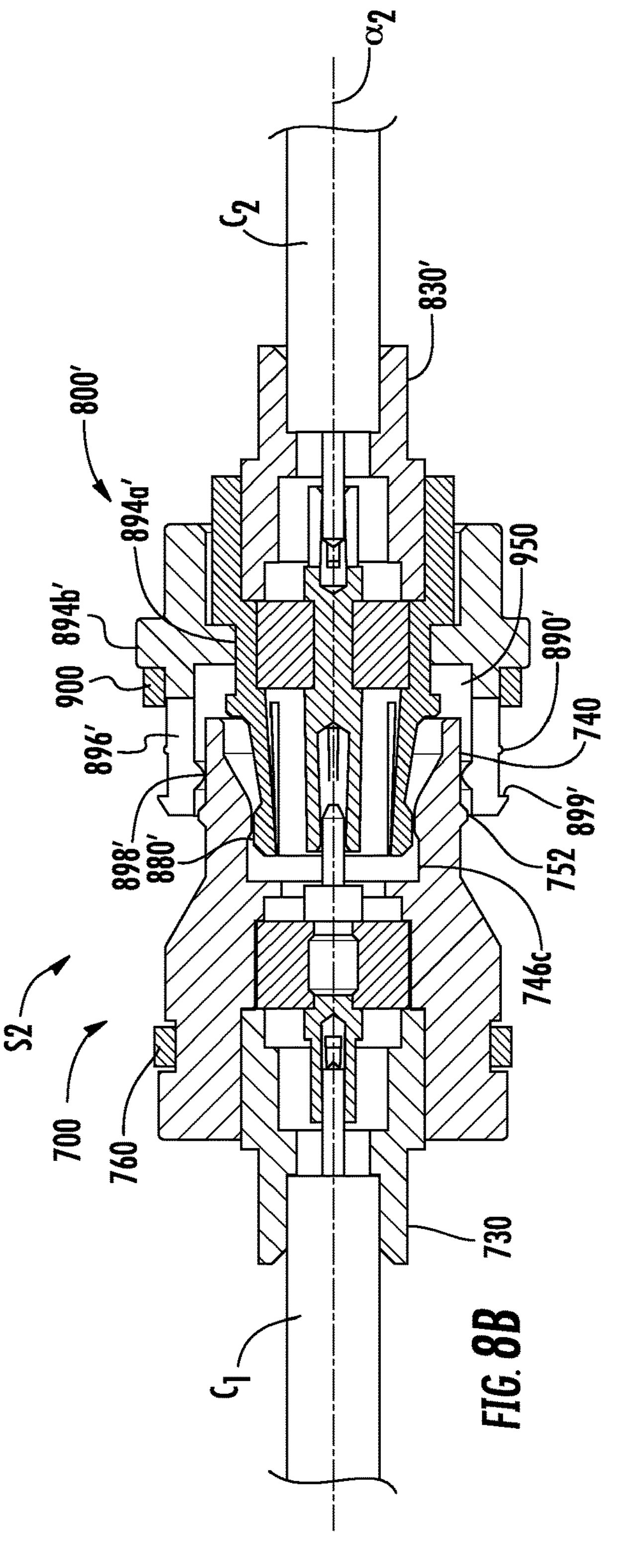
Figure 8C:
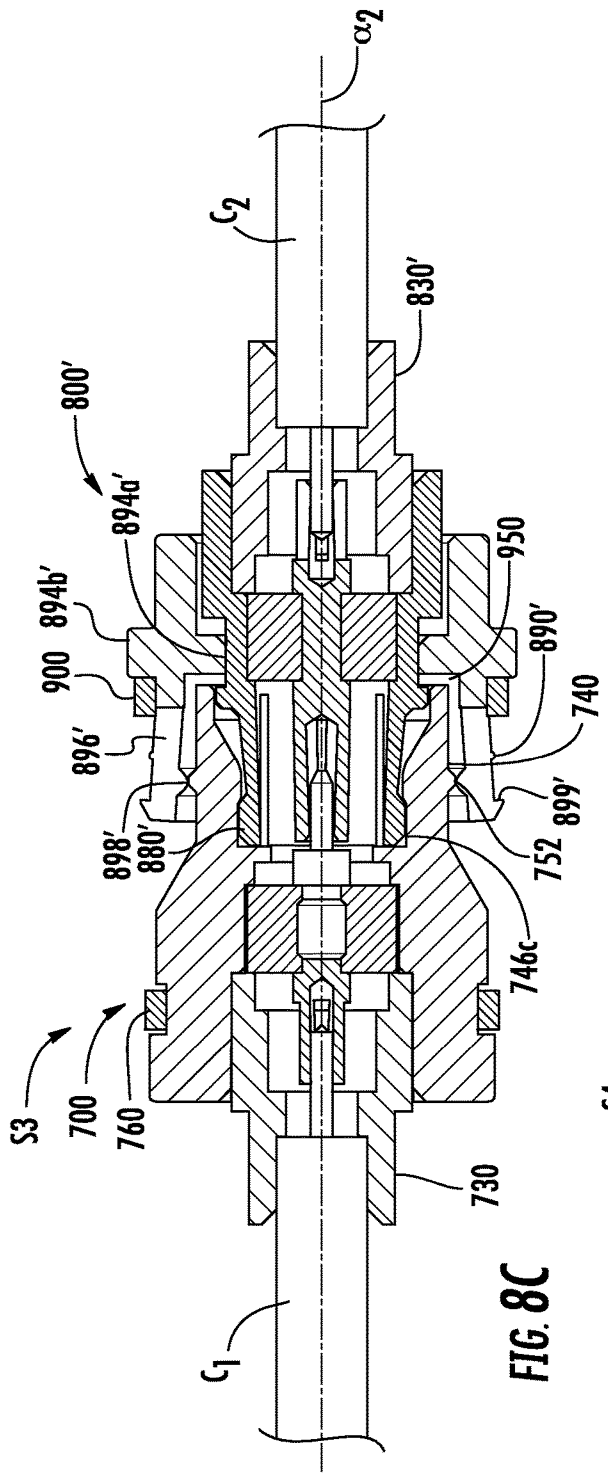
Figure 8D:
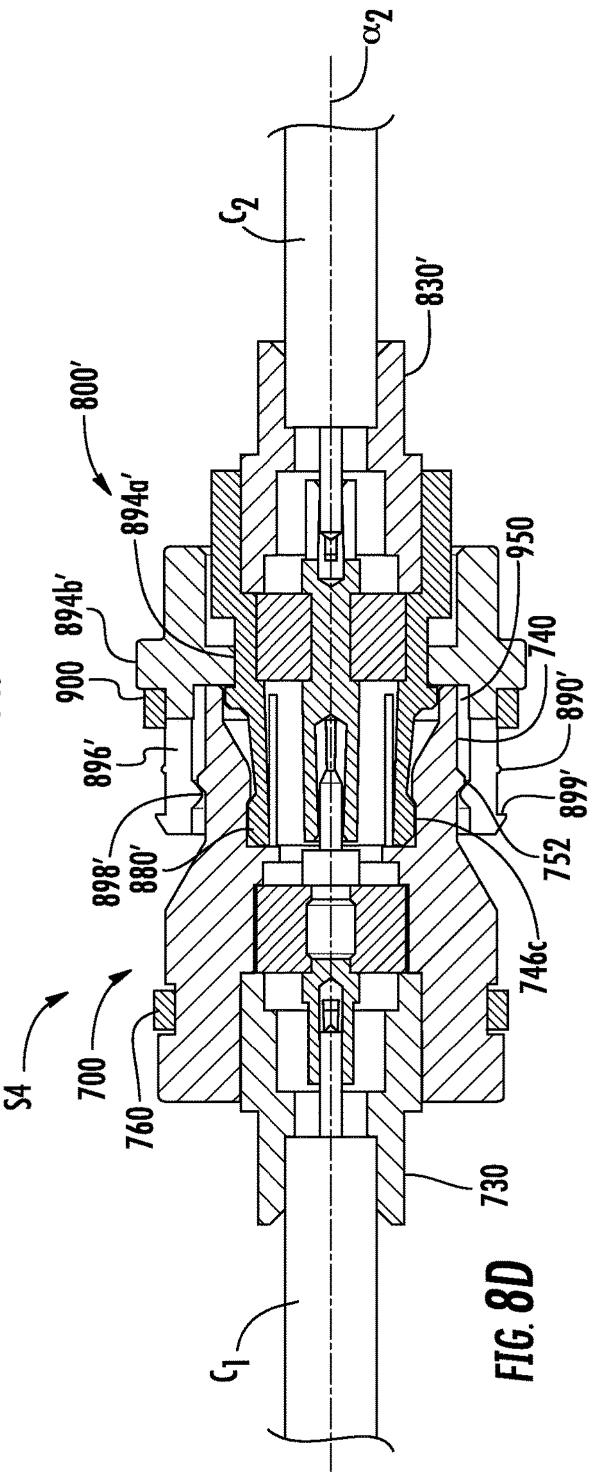
Figure 8E:
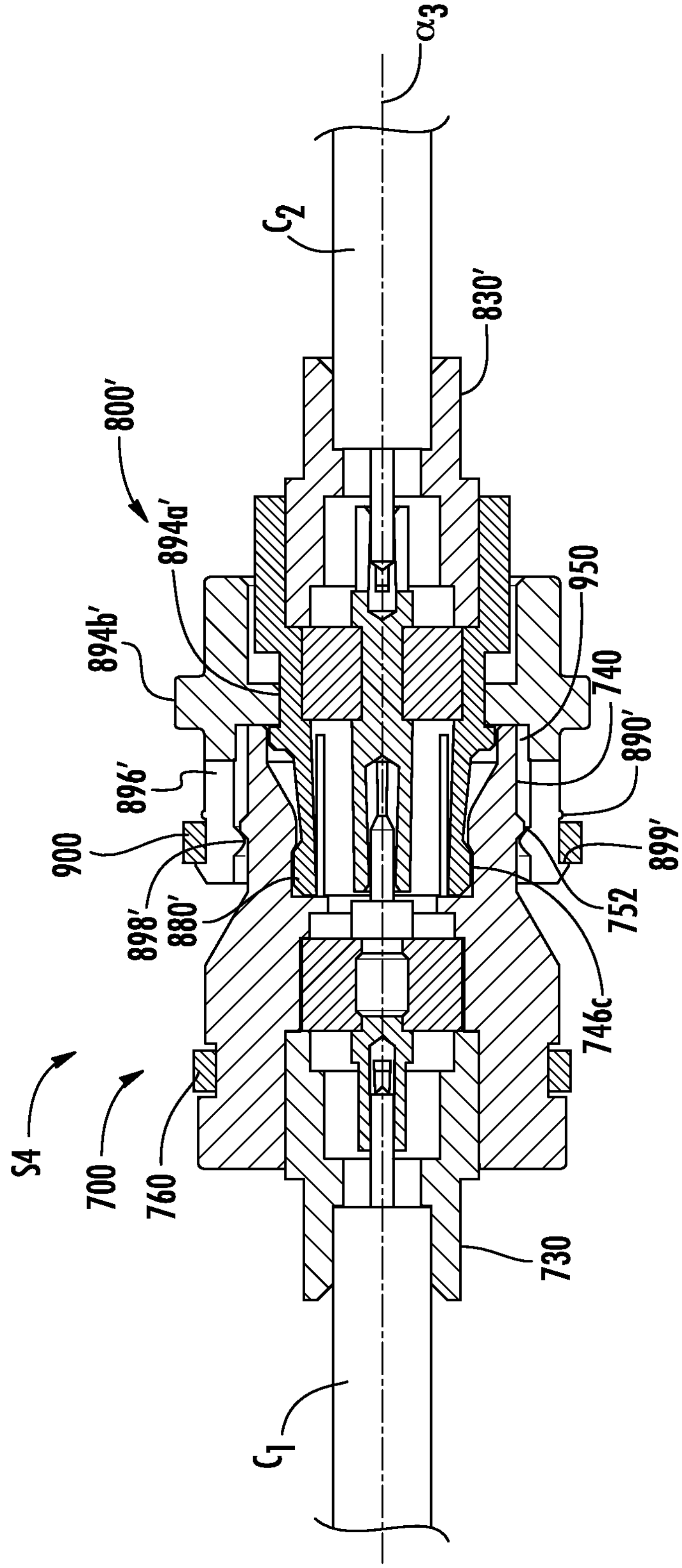

FIGS. 8A-8E show a connector pair P2, including the male connector 700 and the female connector 800' at various stages 51, S2, S3, S4, S5. Specifically, FIG. 8A shows the pair P2 at an unmated stage 51, FIG. 8B shows the pair P2 at an initially-mated stage S2, FIGS. 8C-8D shows the pair P2 at partially-mated stages S3, S4 and FIG. 8E shows the pair P2 at a fully-mated stage S5. Each of these elements, upon assembly, are substantially aligned along a central axis $\alpha_2$. As with the first coaxial pair P1, at each of the respective stages for the connected pair P2, an interface opening 950 may be apparent.

During mating of the connector pair P2, the locking ring 900 is shown axially advancing toward the male connector 700. In the S5 stage, the locking ring 900 is positioned over the locking feature 899'. As the locking feature 899' abuts the locking ring 900, slotted fingers 920 are prevented from moving radially outward. FIGS. 8C and 8D show partial cross-sectional views of the coaxial cable connector pair P2 in partially engaged positions with the female connector 800' being advanced to the point that fingers 896' are compressed radially inward and then outward as the fingers 896' are positioned against detent 746*c*. The locking ring 900 remains in a disengaged rearward position and the locking feature 898' is proximate to outer diametral surfaces of the male connector 700.

FIG. 8E is a partial cross-sectional view the coaxial cable connector pair P2 in a fully-mated position. Here, the locking ring 900 is shown in a forward, locked position having been urged over the annular locking feature 899'. The locking ring 900 is thus circumferentially disposed about fingers 896' such that the fingers are prevented from moving radially outward, thereby providing another locking mechanism for the connector pair P2. Accordingly, the connector pair P2 has multiple locking engagements: a snap-fit engagement between fingers 880' and detent 746*c*, a locking engagement between locking features 752 and 898' and a locking ring 900 circumferentially disposed about fingers 896' such that the fingers are prevented from moving radially outward.

Accordingly, it will be apparent to those skilled in the art that various modifications and variations can be made to the disclosed locking RF coaxial connectors and the elements thereof without departing from the scope of the disclosure. Other embodiments of the present disclosure will be apparent to those skilled in the art from consideration of the specification and practice of the present disclosure. It is intended that the specification and examples be considered as exemplary, with a true scope of the present disclosure being indicated by the following claims and their equivalents.

What is claimed is:

1. An RF coaxial connector, comprising:

a male connector, comprising:
  a male connector central conductor,
  a male connector dielectric positionable over an outer surface of the male connector central conductor,
  a male connector bushing positionable adjacent to the male connector dielectric and over at least a portion of the male connector central conductor, and
  a male connector outer conductor positionable over an outer surface of the male connector dielectric and at least a portion of the male connector bushing,
wherein the male connector outer conductor comprises a plurality of stepped inner surfaces and a radially outward extending locking feature, and wherein the plurality of stepped inner surfaces comprises a detent,
wherein the male connector is matable with a female connector at a plurality of stages such that the male connector and the female connector are configured for multiple locking engagements.

2. The RF coaxial connector of claim 1, wherein the female connector comprises a female connector outer conductor having a plurality of fingers in snap-fit engagement with the detent of the male connector outer conductor.

3. The RF coaxial connector of claim 2, wherein at a fully-mated stage, the plurality of fingers of the female connector outer conductor mate with the detent of the male connector outer conductor.

4. The RF coaxial connector of claim 1, wherein at a fully-mated stage the radially outward extending locking feature of the male connector outer conductor engages with a radially inward extending locking feature of a female connector locking element.

5. The RF coaxial connector of claim 1, wherein the female connector comprises a female connector central conductor having a first end and a second end formed as female sockets.

6. The RF coaxial connector of claim 5, wherein each female socket comprises at least two slotted fingers configured to open radially outward and mate with a portion of a coaxial cable.

7. The RF coaxial connector of claim 1, wherein the male connector central conductor comprises a first end configured as a female socket.

8. The RF coaxial connector of claim 7, wherein the first end comprises at least two slotted fingers.

9. The RF coaxial connector of claim 8, wherein the at least two slotted fingers of the male connector central conductor are configured to receive a coaxial cable.

10. The RF coaxial connector of claim 7, wherein the male connector central conductor further comprises a second end opposing the first end being formed as a pin element.

11. The RF coaxial connector of claim 10, wherein the second end comprises a central conductor pin element.

12. The RF coaxial connector of claim 10, wherein the male connector central conductor further comprises a medial central conductor portion connecting the first end and the second end.

13. The RF coaxial connector of claim 1, wherein the male connector bushing further comprises a plurality of stepped outer surfaces.

14. The RF coaxial connector of claim 13, wherein the plurality of stepped outer surfaces comprises a ring detent.

15. The RF coaxial connector of claim 14, wherein the ring detent is configured for mating with an identification ring.

16. The RF coaxial connector of claim 1, wherein the RF coaxial connector further comprises an identification ring configured to couple with the male connector bushing.

17. The RF coaxial connector of claim 1, further comprising a locking ring positionable over a portion of a female connector, wherein the locking ring is configured to axially advance toward the male connector.

18. The RF coaxial connector of claim 17, wherein the locking ring is configured for positioning over an annual locking feature.

19. The RF coaxial connector of claim 17, wherein the locking ring is positionable over the plurality of fingers of the female connector outer conductor.

20. An RF coaxial connector, comprising:

a male connector, comprising:
  a male connector central conductor,
  a male connector dielectric positionable over an outer surface of the male connector central conductor,
  a male connector bushing positionable adjacent to the male connector dielectric and over at least a portion of the male connector central conductor, and
  a male connector outer conductor positionable over an outer surface of the male connector dielectric and at least a portion of the male connector bushing,
wherein the male connector outer conductor comprises a plurality of stepped inner surfaces and a radially outward extending locking feature, and wherein the plurality of stepped inner surfaces comprises a detent;
a locking ring positionable over a portion of a female connector and configured to axially advance toward the male connector,
wherein the male connector and the female connector are configured to mate at a plurality of stages such that the male connector and the female connector are configured for multiple locking engagements.

* * * * *